United States Patent
Wilby

(10) Patent No.: US 11,549,814 B2
(45) Date of Patent: Jan. 10, 2023

(54) UNDERWATER CELESTIAL NAVIGATION BEACON

(71) Applicant: Raytheon Company, Waltham, MA (US)

(72) Inventor: Andrew Wilby, East Greenwich, RI (US)

(73) Assignee: Raytheon Company, Waltham, MA (US)

( * ) Notice: Subject to any disclaimer, the term of this patent is extended or adjusted under 35 U.S.C. 154(b) by 904 days.

(21) Appl. No.: 16/418,713

(22) Filed: May 21, 2019

(65) Prior Publication Data

US 2020/0370892 A1   Nov. 26, 2020

(51) Int. Cl.
*G01C 21/20* (2006.01)
*G01S 1/74* (2006.01)
*G01C 21/02* (2006.01)
*G01C 21/12* (2006.01)

(52) U.S. Cl.
CPC ............. *G01C 21/20* (2013.01); *G01C 21/02* (2013.01); *G01C 21/12* (2013.01); *G01S 1/74* (2013.01)

(58) Field of Classification Search
CPC ........ G01C 21/20; G01C 21/02; G01C 21/12; G01C 21/165; G01C 21/203; G01S 1/74; G01S 5/18; G01S 1/75
See application file for complete search history.

(56) References Cited

U.S. PATENT DOCUMENTS

| 7,376,507 B1 | 5/2008 | Daily et al. |
| 2007/0297289 A1 | 12/2007 | Polvani |
| 2018/0130357 A1 | 5/2018 | Theriault et al. |

FOREIGN PATENT DOCUMENTS

| JP | H04-190111 A | 7/1992 |
| JP | 2666006 B2 * | 10/1997 |

OTHER PUBLICATIONS

International Search Report for International Application No. PCT/US2020/023686 dated Dec. 9, 2020, 13 pages.

* cited by examiner

*Primary Examiner* — Rami Khatib

(57) ABSTRACT

An underwater celestial navigation beacon configured to provide position information is disclosed. The underwater celestial navigation beacon can include a data store configured to store an astronomical model of the moon. The underwater celestial navigation beacon can include an inertial measurement unit (IMU) operable to capture IMU data that includes three-axis acceleration data and three-axis rate gyroscopic data. The underwater celestial navigation beacon can include a controller. The controller can determine a latitude of the underwater celestial navigation beacon using the three-axis rate gyroscopic data. The controller can determine a longitude of the underwater celestial navigation beacon based on a gravitational pull of the moon, using the three-axis acceleration data and the astronomical model of the moon. The controller can determine the position information for the underwater celestial navigation beacon based on the latitude and longitude.

19 Claims, 6 Drawing Sheets

UNDERWATER CELESTIAL NAVIGATION BEACON

BACKGROUND

Marine navigation can involve the determination of position and direction of a marine vehicle, such as a boat, ship, autonomous underwater vehicle (AUV), etc. The position can include a latitude and longitude. The latitude (expressed in degrees) of a place on Earth is its angular distance north or south of the equator. The longitude of a place on Earth is an angular distance east or west of the prime meridian or Greenwich meridian. In the past, mariners would calculate latitude using a sextant, which would measure an angle between an astronomical object (e.g., the sun) and the horizon. In addition, in the past, mariners would calculate longitude also using a sextant. For example, the sextant could be used to measure a lunar distance between the moon and another celestial object (such as a star or planet), which could be used along with a nautical almanac to provide the longitude. In later years, longitude was measured using a marine chronometer, which is a precise timepiece used to determine longitude by accurately measuring the time of a known fixed location (e.g., Greenwich Mean Time, or GMT) and the time of the current location. For example, mariners would keep at least one marine chronometer on GMT to calculate their longitude from the Greenwich meridian, which was considered to have a longitude of zero degrees.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
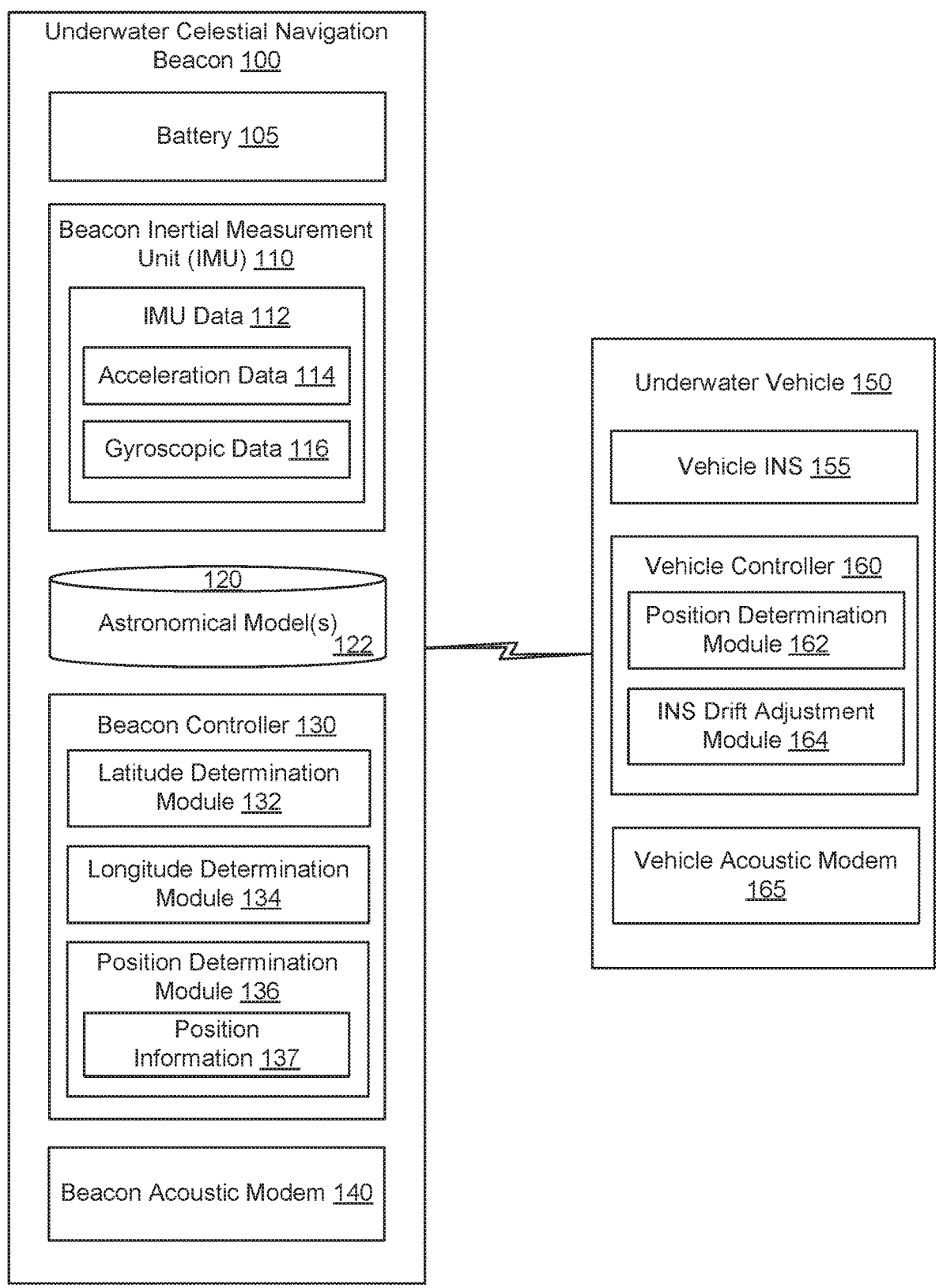
FIG. 1 illustrates an underwater celestial navigation beacon operable to determine its position in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

While underwater, underwater vehicles, such as autonomous underwater vehicles (AUVs) or unmanned underwater vehicles (UUVs) can be denied access to direct navigation information. For example, while underwater, underwater vehicles cannot access global positioning system (GPS) satellites, so underwater vehicles are unable to continuously navigate using GPS signals unless periodically surfacing to gain access to the GPS satellites. Typically, underwater vehicles navigate inertially. Underwater vehicles can use an inertial navigation system (INS) that includes a group of accelerometers and a group of rate gyroscopes. Acceleration data and gyroscopic data can be combined in a Kalman filter to determine a velocity of the underwater vehicle, as well as for maintaining a position of the underwater vehicle in relation to a starting position. As an example, by using the INS, the underwater vehicle can perform a daylong mission and can finish at a few tens of meters from the starting position.

In certain situations, it can be advantageous to periodically provide an absolute position to the underwater vehicle. The absolute position can enable the underwater vehicle to reset its INS position, especially when the underwater vehicle is underwater for an extended period of time. In other words, the INS can input the absolute position into its Kalman filter and use the absolute position to ensure that an INS-calculated position does not drift from the absolute position.

In one example of a prior or known solution, the absolute position can be provided to the underwater vehicle using GPS, but this necessitates that the underwater vehicle briefly resurface to establish a line of sight with the GPS satellite(s). Depending upon the particular situation or circumstances in which the underwater vehicle is operating, this can be impractical. For example, in the event the underwater vehicle is performing a covert operation, it can be disadvantageous or even detrimental for the underwater vehicle to return to the surface as this creates the potential for detection. In another example, the underwater vehicle could be operating several feet or even miles below the surface. Thus, resurfacing to receive the absolute position can take an extended period of time (e.g., 3-4 hours), which creates timing, resource, and other issues for the underwater vehicle and its controllers/operators.

In another example of a prior or known solution, the absolute position can be provided to the underwater vehicle using a chase boat operating on the surface of the water. The chase boat can have a GPS system capable of determining its position. The chase boat can further comprise an offshore baseline tracking system, which can track the location of the underwater vehicle acoustically in relation to the chase boat.

The chase boat can periodically send an acoustic message to the underwater vehicle with the underwater vehicle's position, and the underwater vehicle can use this information accordingly.

In yet another example of a prior or known solution, the underwater vehicle can determine its absolute position using an array of navigation beacons placed on the seabed. The array of navigation beacons can be dropped on the seabed and surveyed into position. After the array of navigation beacons are surveyed into position, there can be an interrogation cycle in which the underwater vehicle sends a message to one of the navigation beacons in the array. The navigation beacon can respond with its surveyed position. The underwater vehicle can then calculate its range and bearing (or angle) to that navigation beacon. Based on the received position, the range and the bearing, the underwater vehicle can then calculate its own position. However, the surveying process can involve a survey boat moving around the array of navigation beacons to survey them into position, which is an expensive and non-covert process.

In one example, an array of navigation beacons useable in the previous solution can be acoustic positioning systems, such as long baseline (LBL), ultra-short baseline (USBL) or short baseline (SBL). However, USBL arrays require a surface vessel, such as GPS, which is not always be available. LBL arrays can be bottom-mounted transponders, previously surveyed into known positions. The problem with LBL solutions is that the surveying process is lengthy, non-covert, and costly.

With this backdrop, the present technology sets forth a navigation beacon (or navigation fiducial or navigation unit) that can be deployed (e.g., dropped) from a ship or aircraft into a body of water (e.g., an ocean, sea). The navigation beacon can settle on the ocean floor and seabed at an arbitrary location and at a given orientation while remaining stationary, and the navigation beacon can autonomously determine its own position while underwater using internal sensors. For example, the navigation beacon can provide an LBL-like capability and determine its own absolute position underwater, but without having to surface to receive a GPS signal, without communicating with a chase boat, and without being surveyed into position, in contrast to the prior known solutions discussed above. After the navigation beacon determines its own absolute position, the navigation beacon can be used as an LBL navigation beacon and can provide absolute position information to other water vehicles, such as AUVs or ships. The vehicles can use the absolute position information to recalibrate their INS and compensate for any drift in the INS navigation solution.

As discussed in further detail below, the navigation beacon can determine its own position using an inertial measurement unit (IMU) and without a reference to external sensors. The IMU can include a group of accelerometers and a group of gyroscopes that function to resolve the latitude and longitude of the navigation beacon, thereby providing its position. The IMU can measure acceleration data and gyroscopic data underwater over a period of time, which can enable the navigation beacon to determine its position while underwater and without access to or in the absence of the sun, GPS satellites, etc. This is in contrast to previous or prior solutions that resolve latitude and longitude using a sextant, which require direct visual access to celestial objects, such as the sun, moon or other stars.

In an alternative configuration, the navigation beacon can be stationary at a location above water. For example, the navigation beacon can be placed in a building or outside in a stationary manner. The navigation beacon can determine its position (latitude and longitude) using measured acceleration data and gyroscopic data, without the aid of GPS or other positioning solutions.

FIG. 1 illustrates an example of an underwater celestial navigation beacon 100 operable to determine position information 137 and provide the position information 137 to an underwater vehicle 150, such as an AUV, UUV or any other type of underwater vehicle. The underwater celestial navigation beacon 100 can be in a stationary position, such as on an ocean floor or seabed. The underwater celestial navigation beacon 100 can include a battery 105. The underwater celestial navigation beacon 100 can include a beacon IMU 110. The underwater celestial navigation beacon 100 can include a data store 120 that locally stores astronomical models 122 of the moon onboard the underwater celestial navigation beacon 100. The underwater celestial navigation beacon 100 can include a beacon controller 130. The underwater celestial navigation beacon 100 can include a beacon acoustic modem 140 (or acoustic transponder). In addition, the underwater vehicle 150 can include a vehicle INS 155, a vehicle controller 160 and a vehicle acoustic modem 165 (or acoustic transponder).

In one configuration, the beacon IMU 110 can capture or measure IMU data 112 over a period of time. The beacon IMU 110 can be a low power and low cost IMU. The beacon IMU 110 can include motion sensors (e.g., accelerometers) and rotation sensors (e.g., gyroscopes) to capture or measure acceleration data 114 and gyroscopic data 116, respectively, as measure over time. For example, the beacon IMU 110 can include three accelerometers that correspond to three coordinates, and the beacon IMU 110 can include three gyroscopes that correspond to the three coordinates. The acceleration data 114 can be three-axis acceleration data, and the gyroscopic data 116 can be three-axis rate gyroscopic data.

In one configuration, the beacon controller 130 can determine the position information 137 for the underwater celestial navigation beacon 100 using a latitude determination module 132, a longitude determination module 134 and a position determination module 136 that execute on the beacon controller 130, respectively. The latitude determination module 132 can determine a latitude of the underwater celestial navigation beacon 100. The longitude determination module 134 can determine a longitude of the underwater celestial navigation beacon 100. The position determination module 136 can determine the position information 137 for the underwater celestial navigation beacon 100 based on the calculated latitude and the calculated longitude.

In one example, since the underwater celestial navigation beacon 100 is generally stationary and does not move, the position information 137 for the underwater celestial navigation beacon 100 can be accurate for an extended period of time. In some cases, the beacon controller 130 can periodically recalculate the position information 137 for the underwater celestial navigation beacon 100, in order to account for a situation in which the underwater celestial navigation beacon 100 has changed position.

In one configuration, the latitude determination module 132 can use the gyroscopic data 116 to measure the rotation of the earth. By sense of ground and sense of down and sense of the rotation of the earth, the latitude determination module 132 can resolve the latitude by a spin rate of the earth. The gyroscopic data 116 can be used to measure the spin rate of the earth and resolve the latitude of the underwater celestial navigation beacon 100. In one example, the latitude determination module 132 can rotate the three gyroscopes into a north-east-down (NED) axis, and can determine an east rotation rate to resolve the latitude of the underwater celestial navigation beacon 100.

In one configuration, the longitude determination module 134 can use the acceleration data 114 along with the astronomical model(s) 122 of the moon to determine the longitude of the underwater celestial navigation beacon 100. The longitude determination module 134 can determine, using the measured acceleration data 114, changes in gravity or a gravitational pull due to the various cycles of the moon as it orbits around the earth. The longitude determination module 134 can determine a phase (or change of phase) of that gravity or gravitational pull with respect to the astronomical model(s) 122 (e.g., an almanac) of the moon. The phase measurements of the moon can be used to determine the longitude of the underwater celestial navigation beacon 100. In one example, since the longitude determination module 134 can be measuring the gravitational pull as the moon rotates around the earth as a function of time, the acceleration data 114 can be collected using an on-board clock over an extended period of time (e.g., several months) to obtain several cycles of a gravity sine wave. By collecting the acceleration data 114 over multiple cycles (i.e., multiple months), the longitude determination module 134 can determine multiple phase measurements of the moon as a function of time, which can provide greater accuracy. The longitude determination module 134 can compare or use the multiple phase measurements of the moon along with the astronomical model(s) 122 of the moon in order to resolve the longitude of the underwater celestial navigation beacon 100. The effects of the moon as a function of time can be an observable reflection of longitude.

In one example, the phase of the moon can be determined by measuring the gravitational pull of the moon and sun, although the moon can have a greater gravitational pull on the earth as compared to the sun. Unlike past solutions, the longitude determination module 134 does not involve visual access to the moon, the sun or another celestial object to determine the longitude, but rather measures a gravitational effect of the moon and sun using the acceleration data 114 captured over multiple cycles in order to resolve the longitude.

In one example, the longitude determination module 134 can use the acceleration data 114 to look at oscillations in apparent acceleration caused by the gravitational pull of the moon. Together with known astronomical model(s) 122 of the moon, the longitude can be resolved. In one example, the longitude determination module 134 can determine a magnitude of north-east-down acceleration over the period of time based on the acceleration data 114, which can be a variation of gravity. In other words, the acceleration data 114 collected over the period of time can indicate variations in local gravity caused by the influence of the moon. This information can be used to determine the phase of the moon, which can be used along with the astronomical model(s) 122 of the moon to determine the longitude of the underwater celestial navigation beacon 100.

In one configuration, the position determination module 136 can receive latitude information and longitude information from the latitude determination module 132 and the longitude determination module 134, respectively. The position determination module 136 can determine the position information 137 based on the received latitude information and the received longitude information. The position information 137 can be stored in a memory of the beacon controller 130. Therefore, based on a rotation rate (determined using the gyroscopic data 116) and a gravity phase (determined using the acceleration data 114), an accurate positioning (latitude and longitude, respectively) of the underwater celestial navigation beacon 100 can be performed. An accuracy of the position information 137 can depend on the accuracy of the beacon IMU 110 (i.e., accuracy of accelerometers and gyroscopes), an on-board clock, and an observation time (e.g., the number of cycles or months for which data is collected). An increased observation time can result in more accurate phase measurements of the moon as the function of time, thereby resulting in more accurate position information 137.

In one configuration, the beacon controller 130 can determine the position information 137 for the underwater celestial navigation beacon 100, and after the position information 137 is determined, the underwater celestial navigation beacon 100 can enter into a sleep mode or low power mode. At this point, the beacon IMU 110 may not capture additional acceleration data 114 and additional gyroscopic data 116, at least for purposes of determining the position information 137. In some cases, the position information 137 can be adjusted at a later time, in which case the beacon IMU 110 can capture additional acceleration data 114 and additional gyroscopic data 116.

In one configuration, after the position information 137 is determined (e.g., a few months after being dropped in the water), the underwater celestial navigation beacon 100 can go online and be available to communicate that position information 137 to other vehicles, such as the underwater vehicle 150. Although the underwater celestial navigation beacon 100 can enter into the sleep mode or low power mode after the position information 137 is determined, the underwater celestial navigation beacon 100 can be available (e.g., upon waking) to provide that position information 137 to other vehicles, such as the underwater vehicle 150.

For example, the vehicle acoustic modem 165 in the underwater vehicle 150 can transmit an awake message (or USBL pulse). The awake message can be coded to prevent adversarial utility, such as spoofing or jamming. When the beacon acoustic modem 140 is within a certain distance (e.g., a few hundred meters to a kilometer) from the underwater vehicle 150, the beacon acoustic modem 140 can detect the awake message transmitted by the vehicle acoustic modem 165. The receipt of the awake message can cause the celestial navigation beacon 100 to awaken from the sleep mode or low power mode (i.e., the celestial navigation beacon 100 can enter an awake mode or normal power mode). In other words, the celestial navigation beacon 100 can go to sleep until being pinged. The receipt of the awake message can cause the celestial navigation beacon 100 to enter the normal power or awake mode and transmit, via the beacon acoustic modem 140, the position information 137 to the underwater vehicle 150. Thus, the underwater vehicle 150 can send the awake message, and in response, the underwater celestial navigation beacon 100 can send the position information 137 to the underwater vehicle 150. It is noted that the position information 137 sent to the underwater vehicle 150 is that of the position of the underwater celestial navigation beacon 100, and does not directly indicate the position of the underwater vehicle 150 since the underwater vehicle 150 can be hundreds of meters away from the underwater celestial navigation beacon 100.

In one example, the vehicle acoustic modem 165 can receive the position information 137, and the position information 137 can be provided to the vehicle controller 160. The vehicle controller 160 can execute a position determination module 162. The position determination module 162 can identify the position information 137, which corresponds to the position of the underwater celestial navigation beacon 100. The position determination module 162 can also determine a range (in meters) and a bearing (or angle, in degrees) between the underwater vehicle 150 and the underwater celestial navigation beacon 100. The position determination module 162 can determine the range and bearing based on an interrogation process between the vehicle acoustic modem 165 and the beacon acoustic modem 140. For example, based on acoustic messaging between the vehicle acoustic modem 165 and the beacon acoustic modem 140, the range and bearing can be determined (e.g., the underwater celestial navigation beacon 100 can be determined as being at a bearing of 25 degrees with a range of 150 meters in relation to the underwater vehicle 150). Based on the range, the bearing and the position information 137, the position determination module 162 can determine the underwater vehicle's own position.

In one example, the underwater vehicle 150 can include an USBL tracking head, which can resolve the range and bearing to the underwater celestial navigation beacon 100 based on the response (i.e., the position information 137) received from the beacon acoustic modem 140.

In one example, the underwater vehicle 150 and the underwater celestial navigation beacon 100 can use a standard coded USBL tracking approach to provide tracking capabilities, which can enable the underwater vehicle 150 and the underwater celestial navigation beacon 100 to exchange acoustic messaging.

In one example, the vehicle controller 160 can execute an INS drift adjustment module 164, which can adjust or recalibrate the vehicle INS 155 using the calculated position of the underwater vehicle 150. Therefore, if the vehicle INS 155 had previously calculated an inaccurate position for the underwater vehicle 150, the INS drift adjustment module 164 can use the calculated position of the underwater vehicle 150 to apply drift correction and correct the vehicle INS 155.

In one configuration, the underwater celestial navigation beacon 100 can include a battery 105. The battery 105 can provide energy to the beacon IMU 110, the beacon controller 130, the beacon acoustic modem 140, etc. As a non-limiting example, the battery 105 can provide sufficient energy for the underwater celestial navigation beacon 100 to be operable for 5-10 years.

In one configuration, the underwater celestial navigation beacon 100 can provide a navigation service, which can be subscribed to by the underwater vehicle 150. In other words, the underwater vehicle 150 can be authorized to access and communicate with the underwater celestial navigation beacon 100 when the underwater vehicle 150 has proper permissions. On the other hand, when a given vehicle does not have a subscription or permission to access the underwater celestial navigation beacon 100, the vehicle may send an awake message, but the underwater celestial navigation beacon 100 may not respond with the position information 137.

In one example, the vehicle INS 155 can operate at a known drift rate. For example, the underwater vehicle 150 can drift by a certain amount over time (e.g., 10 meters per day). Additionally, a range of the beacon acoustic modem 140 and the vehicle acoustic modem 165 can be known (e.g., 500 meters). In this example, multiple underwater celestial navigation beacons can be placed as a bread crumb trail along a given trail, with a density that is high enough that the drift rate of the vehicle INS 155 can be compensated for. In other words, the density can be high enough that the underwater vehicle 150 is still within range (e.g., 500 meters) to one of the underwater celestial navigation beacons placed along the bread crumb trail. As a result, the underwater vehicle 150 is able to receive position information 137 and correct itself.

In an alternative configuration, a celestial navigation beacon can be stationary, but can be located above water. For example, the celestial navigation beacon can be located on land, in a building, etc. The celestial navigation beacon can determine its absolute position, as previously described. The celestial navigation beacon can be used to determine its absolute position in an absence of GPS signals, or in an area where it is undesirable to use GPS signals (e.g., due to spoofing).

Figure 2:
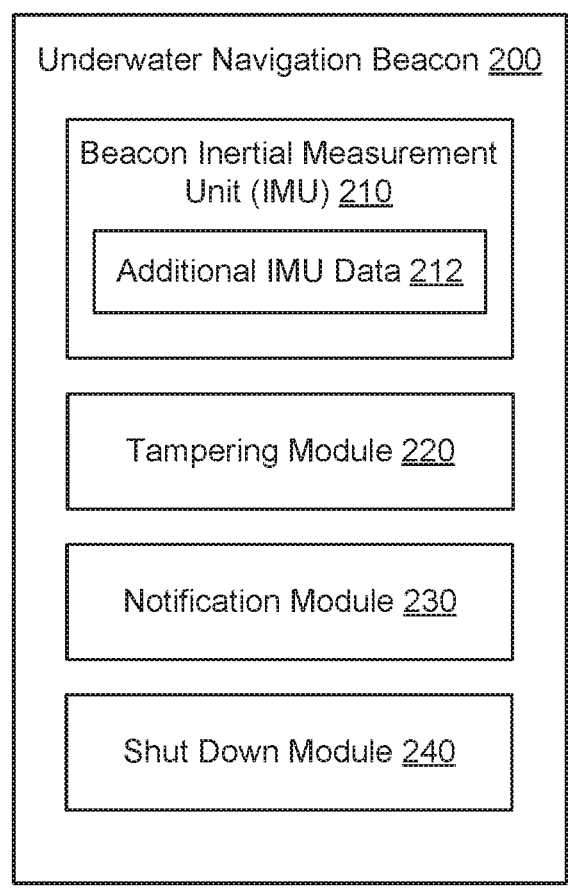
FIG. 2 illustrates an underwater celestial navigation beacon operable to detect potential tampering in accordance with an example.

FIG. 2 illustrates an example of an underwater celestial navigation beacon 200 operable to detect potential tampering. The underwater celestial navigation beacon 200 can include a beacon IMU 210 operable to detect additional IMU data 212, which can include additional acceleration data and/or additional gyroscopic data. The beacon IMU 210 can detect the additional IMU data 212 after position information is determined for the underwater celestial navigation beacon 200, and the additional IMU data 212 can be used to determine whether a potential tampering has occurred with the underwater celestial navigation beacon 200. In other words, the additional IMU data 212 may not be used for determining the position information, but rather for determining whether potential tampering has occurred with the underwater celestial navigation beacon 200. The additional IMU data 212 can indicate whether the underwater celestial navigation beacon 200 has moved by a certain amount. Since the underwater celestial navigation beacon 200 is generally stationary, a relatively large movement of the underwater celestial navigation beacon 200 could indicate potential tampering. At the very minimum, it can indicate that the underwater celestial navigation beacon 200 has move, for whatever reason.

In one example, the underwater celestial navigation beacon 200 can determine the position information, and afterwards turn off the beacon IMU 210 and not collect the additional IMU data 212. However, in this case, if the underwater celestial navigation beacon 200 were to be physically moved (e.g., due to tampering), the underwater celestial navigation beacon 200 would not become aware of this movement. As a result, when the underwater celestial navigation beacon 200 receives an awake message from an underwater vehicle and the underwater celestial navigation beacon 200 responds with position information, the position information can reflect the original position and does not account for the later movement of the underwater celestial navigation beacon 200. In other words, the underwater celestial navigation beacon 200 can provide inaccurate position information because the underwater celestial navigation beacon 200 would not know that the underwater celestial navigation beacon 200 has been moved. Therefore, the beacon IMU 210 can collect the additional IMU data 212 (e.g., the beacon IMU 210 can periodically awake from a sleep mode and collect additional IMU data 212), which can be used to determine whether potential tampering has occurred with the underwater celestial navigation beacon 200.

In one example, the underwater celestial navigation beacon 200 can include a tampering module 220. The tampering module 220 can receive the additional IMU data 212. Based on the additional IMU data 212, the tampering module 220 can determine whether potential tampering has occurred with the underwater celestial navigation beacon 200. For example, when the additional IMU data 212 indicates a relatively large change in acceleration or orientation, the tampering module 220 can determine whether potential tampering has occurred with the underwater celestial navigation beacon 200. In one example, the underwater celestial navigation beacon 200 can include a notification module 230 to provide a notification when movement (e.g., potential tampering) is detected for the underwater celestial navigation beacon 200. In addition, the underwater celestial navigation beacon 200 can include a shutdown module 240 to shut down the underwater celestial navigation beacon 200 when movement such as potential tampering is detected for the underwater celestial navigation beacon 200.

Figure 3:
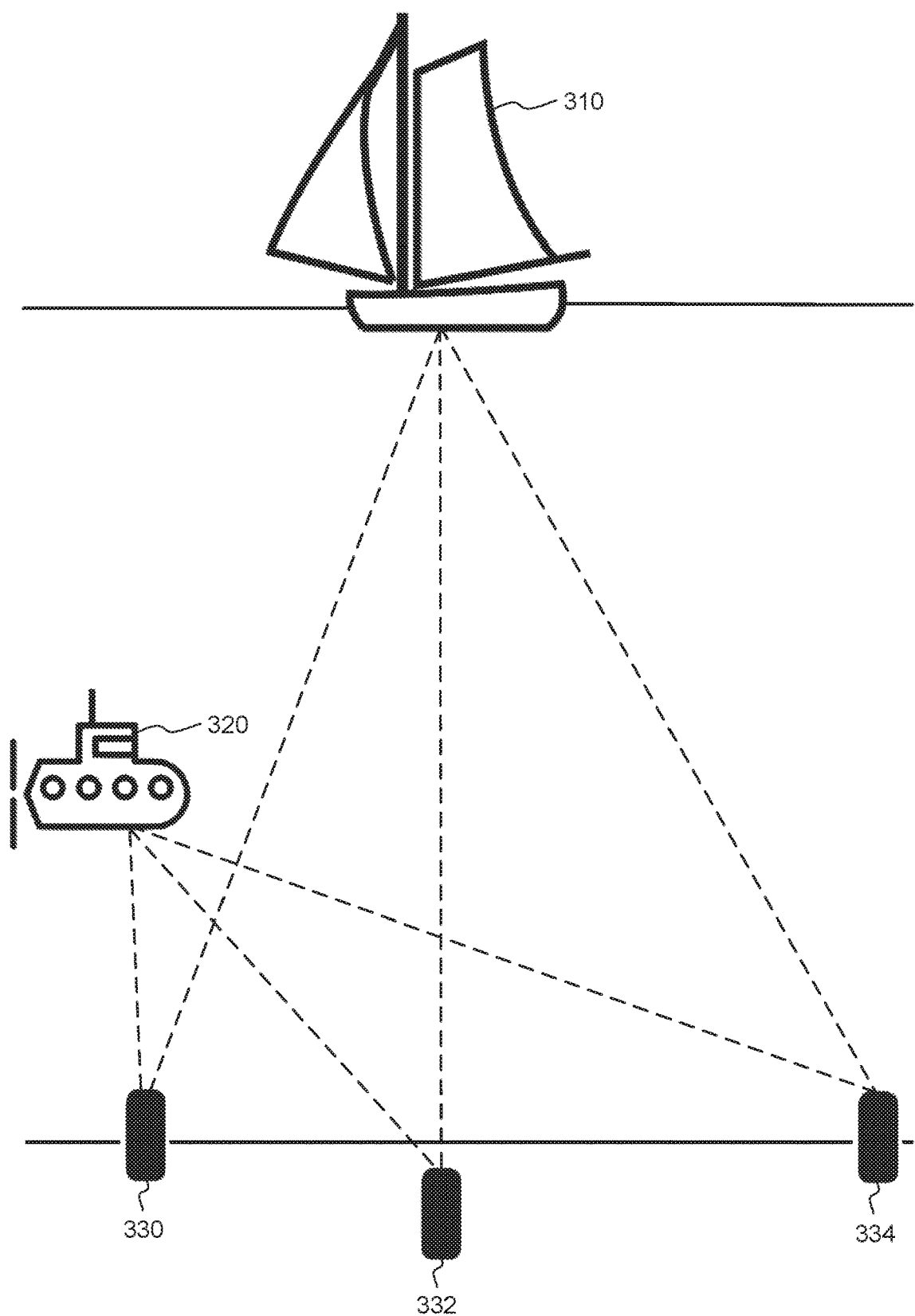
FIG. 3 illustrates an array of underwater celestial navigation beacons in accordance with an example.

FIG. 3 illustrates an example of an array of underwater celestial navigation beacons, such as those placed along a path, which can include a first underwater celestial navigation beacon 330, a second underwater celestial navigation beacon 332, and a third underwater celestial navigation beacon 334. Of course, those skilled in the art will recognize that additional beacons can be included in the array of underwater celestial navigation beacons, and that those identified here and shown in the drawings are not intended to be limiting in any way. An underwater vehicle 320 (e.g., an AUV) or a ship 310 can send acoustic messages to any one of the first, second or third underwater celestial navigation beacons 330, 332, 334, and receive position information. In one example, the underwater vehicle 320 may not navigate inertially, but rather can navigate using the first, second or third underwater celestial navigation beacons 330, 332, 334. For example, the underwater vehicle 320 can have access to three underwater celestial navigation beacons at a given time to navigate without using an INS. The array of underwater celestial navigation beacons can serve to increase a navigation accuracy for the underwater vehicle 320. Depending on the range of acoustic signals, the accuracy of the INS on the underwater vehicle 320, and an amount of INS drift, an appropriate density for the array of underwater celestial navigation beacons (i.e., how close the underwater celestial navigation beacons are together) can be determined.

Figure 4:
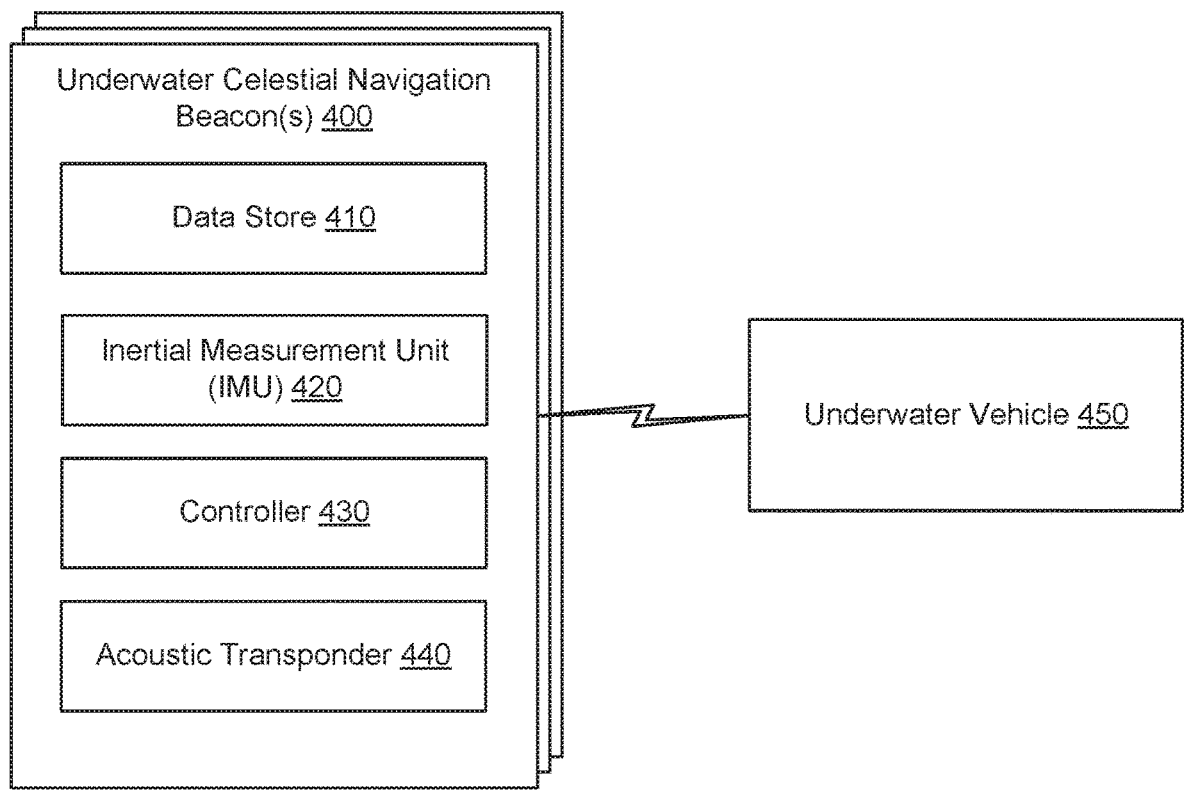
FIG. 4 illustrates underwater celestial navigation beacon(s) in communication with an underwater vehicle in accordance with an example.

FIG. 4 illustrates an example of one or more underwater celestial navigation beacon(s) 400 in communication with an underwater vehicle 450. The underwater celestial navigation beacon(s) 400 can be included in an array of underwater celestial navigation beacons. For example, the array of underwater celestial navigation beacons can be located in different positions along a path. The underwater celestial navigation beacon(s) 400 can be stationary on an ocean floor. The underwater celestial navigation beacon(s) 400 can be configured to provide position information to the underwater vehicle 450. For example, the underwater celestial navigation beacon(s) 400 can provide the position information underwater where GPS signals are absent or not detectable.

In one example, the underwater celestial navigation beacon 400 can include a data store 410 configured to store an astronomical model of the moon. The underwater celestial navigation beacon 400 can include an inertial measurement unit (IMU) 420 operable to capture IMU data that includes three-axis acceleration data and three-axis rate gyroscopic data.

The underwater celestial navigation beacon 400 can include a controller 430. The controller 430 can be a microprocessor that includes processor(s) and memory. The controller 430 can determine a latitude of the underwater celestial navigation beacon 400 using the three-axis rate gyroscopic data. The controller 430 can determine a longitude of the underwater celestial navigation beacon 400 based on a gravitational pull of the moon, using the three-axis acceleration data and the astronomical model of the moon. The controller 430 can determine the position information for the underwater celestial navigation beacon 400 based on the latitude and longitude.

In one example, the controller 430 can determine the gravitational pull of the moon around the earth as a function of time based on the three-axis acceleration data, wherein oscillations in acceleration as indicated by the three-axis acceleration data are caused by the gravitational pull of the moon. The controller 430 can determine a phase of the moon as a function of time based on the gravitational pull of the moon. The controller 430 can resolve the longitude of the underwater celestial navigation beacon 400 using the phase of the moon with the astronomical model of the moon, wherein the astronomical model of the moon indicates known positions of the moon over a period of time. Further, the controller 430 can determine a rotation of the earth using the three-axis rate gyroscopic data in order to resolve the latitude of the underwater celestial navigation beacon 400.

In one example, the controller 430 can determine multiple phase measurements of the moon over two or more cycles of the moon to resolve the longitude of the underwater celestial navigation beacon 400. In addition, the underwater celestial navigation beacon 400 can enter into a low power mode after determining the position information.

In one example, the underwater celestial navigation beacon 400 can include an acoustic transponder 440. The acoustic transponder 440 can receive an awake message from the underwater vehicle 450 (via an acoustic transponder of the underwater vehicle 450). The acoustic transponder 440 can transmit the position information to the underwater vehicle 450 in response to receiving the awake message. The position information can enable the underwater vehicle 450 to determine its position based on the position information associated with the underwater celestial navigation beacon 400 and adjust for inertial navigation system (INS) drift at the underwater vehicle 450.

In one example, the controller 430 can receive, from the IMU 420, additional IMU data after the position information for the underwater celestial navigation beacon 400 is determined. The controller 430 can determine that the underwater celestial navigation beacon 400 has been potentially tampered with based on the additional IMU data. The controller 430 can send a notification indicating a potential tampering of the underwater celestial navigation beacon 400.

In one example, the underwater vehicle 450 can communicate with the array of underwater celestial navigation beacon(s) 400 when traveling along the path to resolve a position for the underwater vehicle 450. The underwater vehicle 450 can receive position information from the underwater celestial navigation beacon(s) 400 in the array at different times when traveling along the path. The underwater vehicle 450 can determine its position when traveling along the path based on the received position information and adjust for INS drift at the underwater vehicle 400.

Figure 5:
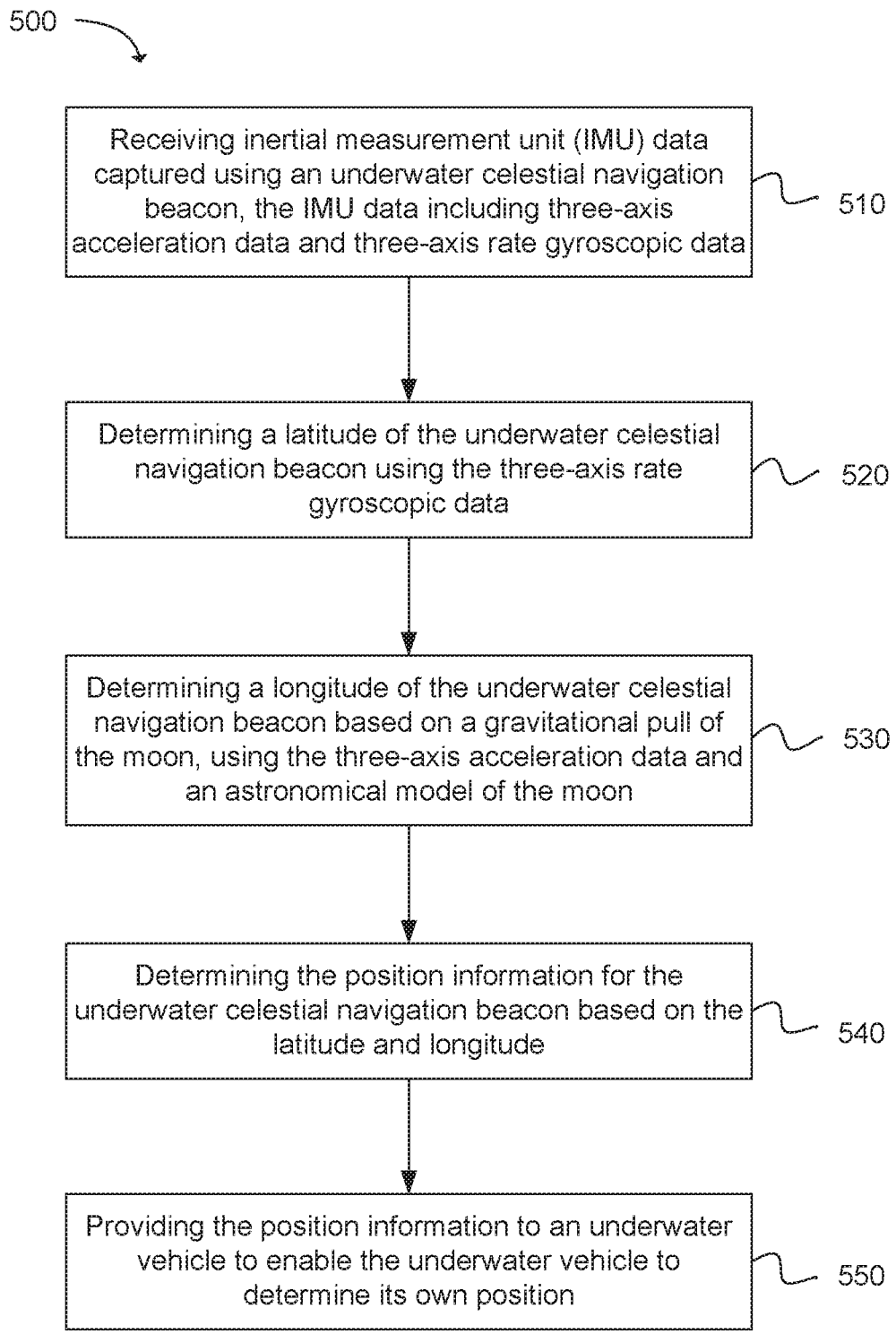
FIG. 5 depicts a flowchart of a non-transitory machine readable storage medium having instructions embodied thereon for providing position information in accordance with an example.

FIG. 5 illustrates a flowchart of a non-transitory machine readable storage medium having instructions embodied thereon for providing position information. The instructions when executed perform the operation of receiving inertial measurement unit (IMU) data captured using an underwater celestial navigation beacon, the IMU data including three-axis acceleration data and three-axis rate gyroscopic data, as shown in block 510. The instructions when executed perform the operation of determining a latitude of the underwater celestial navigation beacon using the three-axis rate gyroscopic data, as shown in block 520. The instructions when executed perform the operation of determining a longitude of the underwater celestial navigation beacon based on a gravitational pull of the moon, using the three-axis acceleration data and an astronomical model of the moon, as shown in block 530. The instructions when executed perform the operation of determining the position information for the underwater celestial navigation beacon based on the latitude and longitude, as shown in block 540. The instructions when executed perform the operation of providing the position information to an underwater vehicle to enable the underwater vehicle to determine its own position, as shown in block 550.

Figure 6:
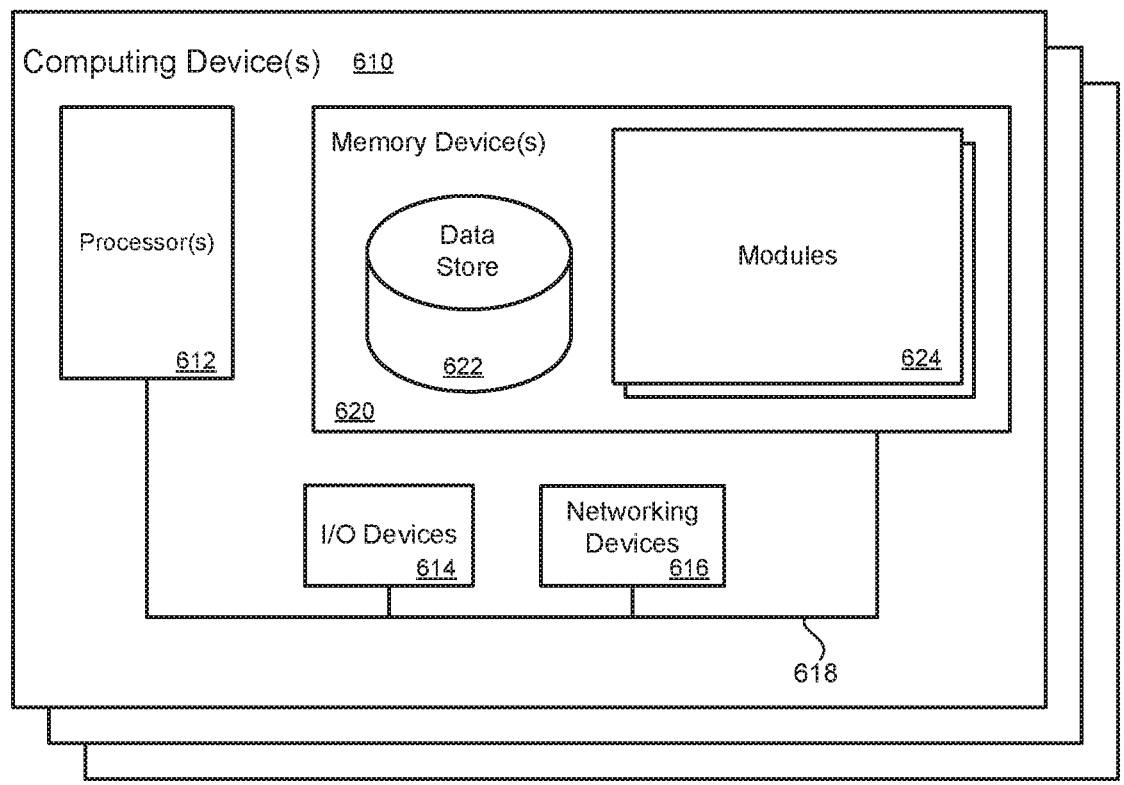
FIG. 6 is a block diagram that provides an example illustration of a computing device that may be employed in accordance with an example.

FIG. 6 illustrates a computing device 610 on which modules of this technology may execute or be executed. A computing device 610 is illustrated on which a high level example of the technology may be executed. The computing device 610 may include one or more processors 612 that are in communication with memory devices 620. The computing device may include a local communication interface 618 for the components in the computing device. For example, the local communication interface may be a local data bus and/or any related address or control busses as may be desired.

The memory device 620 may contain modules 624 that are executable by the processor(s) 612 and data for the modules 624. The modules 624 may execute the functions described earlier. A data store 622 may also be located in the memory device 620 for storing data related to the modules 624 and other applications along with an operating system that is executable by the processor(s) 612.

Other applications may also be stored in the memory device 620 and may be executable by the processor(s) 612. Components or modules discussed in this description that may be implemented in the form of software using high programming level languages that are compiled, interpreted or executed using a hybrid of the methods.

The computing device may also have access to I/O (input/output) devices 614 that are usable by the computing devices. An example of an I/O device is a display screen that is available to display output from the computing devices. Other known I/O device may be used with the computing device as desired. Networking devices 616 and similar communication devices may be included in the computing device. The networking devices 616 may be wired or wireless networking devices that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface 618 may be used as a network to facilitate communication between any of the multiple processors and multiple memories. The local interface 618 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. An underwater celestial navigation beacon configured to provide position information, the underwater celestial navigation beacon comprising:
   a non-transitory machine readable storage medium configured to store an astronomical model of the moon;
   an inertial measurement unit (IMU) operable to capture IMU data that includes three-axis acceleration data and three-axis rate gyroscopic data; and
   a processor configured to:
   determine a rotation of the earth using the three-axis rate gyroscopic data in order to resolve the latitude of the underwater celestial navigation beacon;
   determine a longitude of the underwater celestial navigation beacon based on a gravitational pull of the moon, using the three-axis acceleration data and the astronomical model of the moon; and
   determine the position information for the underwater celestial navigation beacon based on the latitude and longitude,
   wherein the underwater celestial navigation beacon is configured to enter into a low power mode after determining the position information.

2. The underwater celestial navigation beacon of claim 1, wherein the controller is further configured to:
   determine the gravitational pull of the moon around the earth as a function of time based on the three-axis acceleration data, wherein oscillations in acceleration as indicated by the three-axis acceleration data are caused by the gravitational pull of the moon;
   determine a phase of the moon as a function of time based on the gravitational pull of the moon; and
   resolve the longitude of the underwater celestial navigation beacon using the phase of the moon with the astronomical model of the moon, wherein the astronomical model of the moon indicates known positions of the moon over a period of time.

3. The underwater celestial navigation beacon of claim 1, wherein the controller is further configured to determine multiple phase measurements of the moon over two or more cycles of the moon to resolve the longitude of the underwater celestial navigation beacon.

4. The underwater celestial navigation beacon of claim 1, further comprising an acoustic transponder configured to:
   receive an awake message from an underwater vehicle; and
   transmit the position information to the underwater vehicle in response to receiving the awake message, wherein the position information enables the underwater vehicle to determine its position based on the position information associated with the underwater celestial navigation beacon and adjust for inertial navigation system (INS) drift at the underwater vehicle.

5. The underwater celestial navigation beacon of claim 1, wherein the underwater celestial navigation beacon is stationary on an ocean floor.

6. The underwater celestial navigation beacon of claim 1, wherein the underwater celestial navigation beacon is included in an array of underwater beacons that provide position information to an underwater vehicle.

7. The underwater celestial navigation beacon of claim 1, wherein the controller is further configured to provide the position information underwater where global positioning system (GPS) signals are absent.

8. The underwater celestial navigation beacon of claim 1, wherein the controller is further configured to:
   receive, from the IMU, additional IMU data after the position information for the underwater celestial navigation beacon is determined;
   determine that the underwater celestial navigation beacon has been potentially tampered with based on the additional IMU data; and
   send a notification indicating a potential tampering of the underwater celestial navigation beacon.

9. A system for navigating an underwater vehicle, the system comprising:
   an underwater vehicle that includes an acoustic transponder; and
   an underwater celestial navigation beacon, comprising:
   non-transitory machine readable storage medium configured to store an astronomical model of the moon;
   an inertial measurement unit (IMU) operable to capture IMU data that includes three-axis acceleration data and three-axis rate gyroscopic data;
   a processor configured to:
   determine a rotation of the earth using the three-axis rate gyroscopic data in order to resolve the latitude of the underwater celestial navigation beacon;
   determine a longitude of the underwater celestial navigation beacon based on a gravitational pull of the moon, using the three-axis acceleration data and the astronomical model of the moon; and determine the position information for the underwater celestial navigation beacon based on the latitude and longitude; and
an acoustic transponder configured to transmit the position information to the underwater vehicle,
wherein the underwater celestial navigation beacon is configured to enter into a low power mode after determining the position information.

10. The system of claim 9, wherein:
the acoustic transponder of the underwater vehicle is configured to send an awake message to wake up the underwater celestial navigation beacon; and
the acoustic transponder of the underwater celestial navigation beacon is configured to:
receive the awake message from the underwater vehicle; and
transmit the position information to the underwater vehicle in response to receiving the awake message.

11. The system of claim 9, wherein the underwater vehicle is configured to:
determine its position based on the position information received from the underwater celestial navigation beacon; and
adjust for inertial navigation system (INS) drift at the underwater vehicle.

12. The system of claim 9, further comprising:
an array of underwater celestial navigation beacons along a path,
wherein the underwater vehicle is configured to communicate with the array of underwater celestial navigation beacons when traveling along the path to resolve a position for the underwater vehicle.

13. A system for facilitating underwater position determination for underwater vehicles along a path, the system comprising:
an array of underwater celestial navigation beacons that are located in different positions along a path, the array including an underwater celestial navigation beacon comprising:
a non-transitory machine readable storage medium configured to store an astronomical model of the moon;
an inertial measurement unit (IMU) operable to capture IMU data that includes three-axis acceleration data and three-axis rate gyroscopic data; and
a processor configured to:
determine a rotation of the earth using the three-axis rate gyroscopic data in order to resolve the latitude of the underwater celestial navigation beacon;
determine a longitude of the underwater celestial navigation beacon based on a gravitational pull of the moon, using three-axis acceleration data and an astronomical model of the moon; and
determine position information for the underwater celestial navigation beacon based on the latitude and longitude; and
an underwater vehicle configured to receive position information from the underwater celestial navigation beacons in the array at different times when traveling along the path,
wherein the underwater celestial navigation beacon is configured to enter into a low power mode after determining the position information.

14. The system of claim 13, wherein the underwater celestial navigation beacon is further configured to:
determine the gravitational pull of the moon around the earth as a function of time based on the three-axis acceleration data, wherein oscillations in acceleration as indicated by the three-axis acceleration data are caused by the gravitational pull of the moon;
determine a phase of the moon as a function of time based on the gravitational pull of the moon; and
resolve the longitude of the underwater celestial navigation beacon using the phase of the moon with the astronomical model of the moon, wherein the astronomical model of the moon indicates known positions of the moon over a period of time.

15. The system of claim 13, wherein the underwater vehicle is further configured to determine its position when traveling along the path based on the received position information and adjust for inertial navigation system (INS) drift at the underwater vehicle.

16. A method for providing position information, the method comprising:
receiving inertial measurement unit (IMU) data captured using an underwater celestial navigation beacon, the IMU data including three-axis acceleration data and three-axis rate gyroscopic data;
determine a rotation of the earth using the three-axis rate gyroscopic data in order to resolve the latitude of the underwater celestial navigation beacon;
determining a longitude of the underwater celestial navigation beacon based on a gravitational pull of the moon, using the three-axis acceleration data and an astronomical model of the moon;
determining the position information for the underwater celestial navigation beacon based on the latitude and longitude;
providing the position information to an underwater vehicle to enable the underwater vehicle to determine its own position; and
entering into a low power mode after determining the position information.

17. The method of claim 16, further comprising:
determining the gravitational pull of the moon around the earth as a function of time based on the three-axis acceleration data, wherein oscillations in acceleration as indicated by the three-axis acceleration data are caused by the gravitational pull of the moon;
determining a phase of the moon as a function of time based on the gravitational pull of the moon; and
resolving the longitude of the underwater celestial navigation beacon using the phase of the moon with the astronomical model of the moon, wherein the astronomical model of the moon indicate known positions of the moon over a period of time.

18. The method of claim 16, further comprising determining the longitude of the underwater celestial navigation beacon is further configured to: determine multiple phase measurements of the moon over two or more cycles of the moon to resolve the longitude of the underwater celestial navigation beacon.

19. The method of claim 16, further comprising:
receiving an awake message from an underwater vehicle; and
transmitting the position information to the underwater vehicle in response to receiving the awake message, wherein the position information enables the underwater vehicle to determine its position based on the position information associated with the underwater celestial navigation beacon and adjust for inertial navigation system (INS) drift at the underwater vehicle.

* * * * *